(12) United States Patent
Jaradi et al.

(10) Patent No.: US 10,857,970 B2
(45) Date of Patent: Dec. 8, 2020

(54) VEHICLE RESTRAINT SYSTEM

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 105 days.

(21) Appl. No.: 16/269,013

(22) Filed: Feb. 6, 2019

(65) Prior Publication Data

US 2020/0247354 A1   Aug. 6, 2020

(51) Int. Cl.
| | | |
|---|---|---|
| *B60R 22/36* | (2006.01) | |
| *B60R 22/26* | (2006.01) | |
| *B60R 22/02* | (2006.01) | |

(52) U.S. Cl.
CPC .............. *B60R 22/36* (2013.01); *B60R 22/26* (2013.01); *B60R 2022/027* (2013.01)

(58) Field of Classification Search
CPC ........ B60R 22/26; B60R 22/34; B60R 22/36; B60R 2022/027; B60R 2022/028; B60R 2022/4609; B60N 2/14; B60N 2/143; B60N 2/20; B60N 2002/022
See application file for complete search history.

(56) References Cited

U.S. PATENT DOCUMENTS

| | | | | |
|---|---|---|---|---|
| 3,940,164 A | * | 2/1976 | Non .................... | B60R 22/04 280/753 |
| 5,746,467 A | * | 5/1998 | Jesadanont .......... | B60N 2/4221 296/68.1 |
| 6,139,111 A | * | 10/2000 | Pywell ................. | B60N 2/0705 297/484 |
| 6,325,417 B1 | | 12/2001 | Lake | |
| 6,375,270 B1 | * | 4/2002 | Sullivan .................. | B60R 22/26 297/484 |
| 6,773,075 B2 | * | 8/2004 | Rouhana ................ | B60R 22/26 242/378.4 |
| 7,144,085 B2 | * | 12/2006 | Vits ........................ | B60N 2/265 297/483 |
| 7,201,399 B2 | * | 4/2007 | Frank ...................... | B60R 22/02 280/801.1 |
| 7,488,038 B2 | * | 2/2009 | Boyle ................... | B60N 2/2806 297/250.1 |
| 7,513,558 B2 | * | 4/2009 | Hansen ................... | B60N 2/38 244/122 R |

(Continued)

FOREIGN PATENT DOCUMENTS

| | | |
|---|---|---|
| DE | 102010049234 A1 | 6/2011 |
| JP | 2010143372 A | 7/2010 |
| WO | 199505298 A1 | 2/1995 |

*Primary Examiner* — Laura Freedman
(74) *Attorney, Agent, or Firm* — Frank A. MacKenzie; Bejin Bieneman PLC

(57) ABSTRACT

A restraint system includes a seat defining a centerline and including a seat bottom and a seatback. A pair of upper retractors are disposed on the seatback, a pair of lower retractors are disposed on the seat bottom, and a pair of middle retractors are disposed on the seat between the pairs of upper and lower retractors. Each pair of retractors includes one retractor disposed on each side of the centerline.

20 Claims, 4 Drawing Sheets

(56) References Cited

U.S. PATENT DOCUMENTS

| | | | |
|---|---|---|---|
| 7,758,130 B2* | 7/2010 | Jay | B60R 22/00 |
| | | | 297/473 |
| 7,938,447 B2 | 5/2011 | Miyagawa | |
| 8,002,348 B2* | 8/2011 | Jessup | B60N 2/688 |
| | | | 297/216.1 |
| 8,302,995 B2 | 11/2012 | Xu et al. | |
| 9,120,448 B2 | 9/2015 | Nagasawa | |
| 9,358,947 B1* | 6/2016 | Zorn | B60R 22/26 |
| 9,758,127 B1 | 9/2017 | Farooq et al. | |
| 9,884,608 B1* | 2/2018 | Roychoudhury | B60R 22/02 |
| 2004/0036345 A1* | 2/2004 | Herberg | B60R 22/44 |
| | | | 297/480 |
| 2008/0018156 A1* | 1/2008 | Hammarskjold | B60R 22/325 |
| | | | 297/354.1 |
| 2019/0084513 A1* | 3/2019 | Yamamoto | B60R 22/46 |

* cited by examiner

VEHICLE RESTRAINT SYSTEM

BACKGROUND

A vehicle may include amenities that allow occupants to face one another during operation of the vehicle. As one example, an autonomous vehicle may be autonomously operated, allowing occupants of the vehicle to ride in the vehicle without monitoring the operation of the vehicle. Specifically, the autonomous vehicle may include seats free to rotate during the operation of the vehicle. This may allow the occupants of the seats to face each other and to interact. This may also allow all of the occupants to relax, interact with one another, and focus on vehicle amenities. In addition, the seat may be reclined. In such an example, the occupant may sleep with the seat in a reclined position.

DETAILED DESCRIPTION

Figure 1:
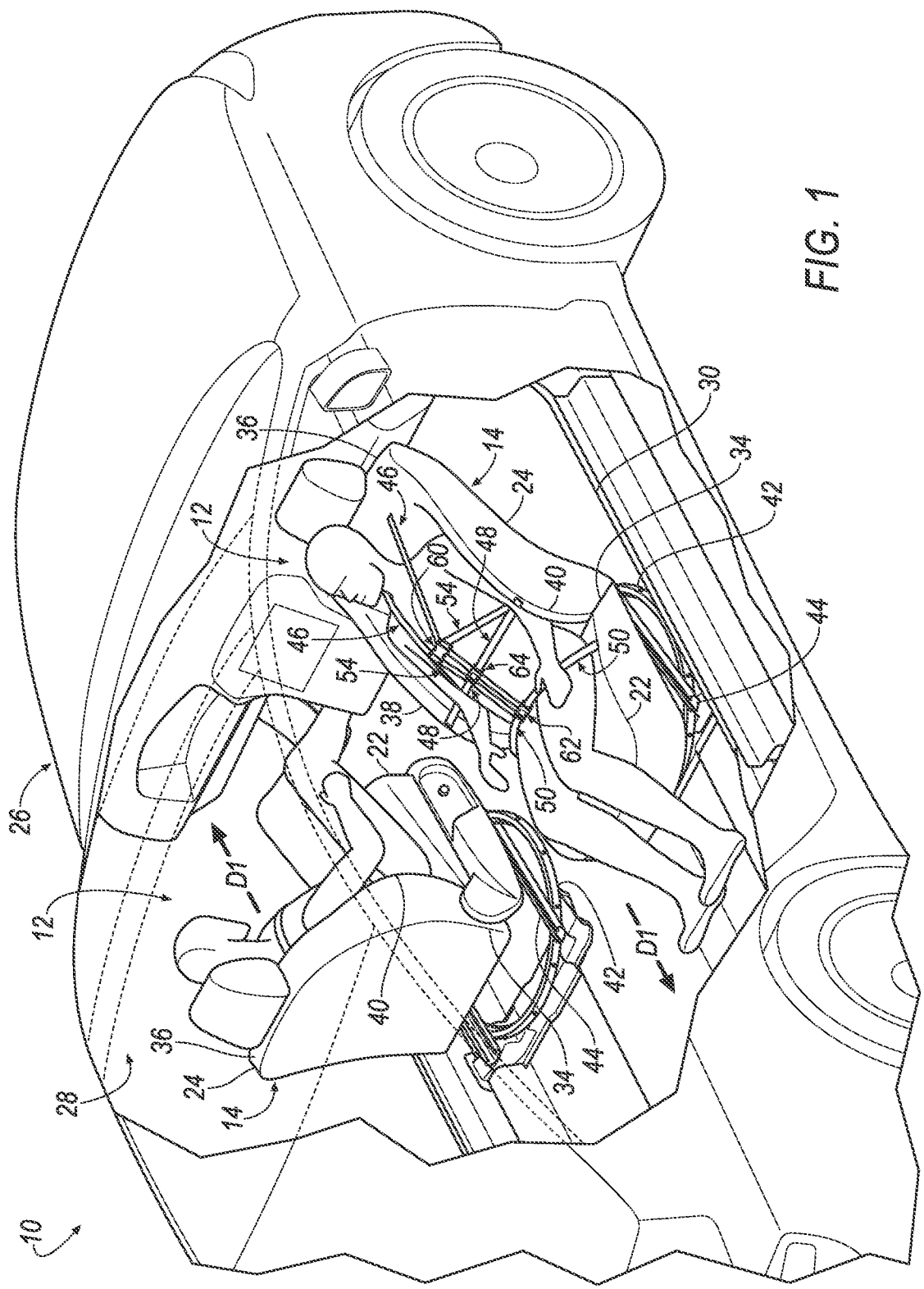
FIG. 1 is a perspective view of a vehicle including a restraint system.

A restraint system includes a seat defining a centerline and including a seat bottom and a seatback. A pair of upper retractors disposed on the seatback, a pair of lower retractors disposed on the seat bottom, and a pair of middle retractors disposed on the seat between the pairs of upper and lower retractors. Each pair of retractors including one retractor disposed on each side of the centerline.

The seatback may include a lower end adjacent to the seat bottom and an upper end spaced from the lower end. The pair of upper retractors may be disposed at the upper end of the seatback.

Each middle retractor may be positioned adjacent to a respective upper arm of an occupant between 5th-percentile female and 95th-percentile male stature sitting in the seat.

The restraint system may include a pair of upper webbings each retractably engaged with the respective upper retractor, a pair of middle webbings each retractably engaged with the respective middle retractor, and a pair of lower webbings each retractably engaged with the respective lower retractor. Each upper webbing may extend transverse to the respective lower webbing and the respective middle webbing.

Each lower webbing and each middle webbing may be attached to the respective upper webbing.

Each middle webbing may be positioned to extend behind a respective upper arm of an occupant between 5th-percentile female and 95th-percentile male stature sitting in the seat.

The restraint system may include an intermediate webbing disposed on each side of the centerline. Each intermediate webbing may extend transversely from the respective middle webbing to the respective upper webbing.

Each intermediate webbing may include a first terminus attached to the respective middle webbing and a second terminus attached to the respective upper webbing. Each second terminus may be disposed between the respective middle webbing and the respective upper retractor.

The restraint system may include comprising a pair of upper locking elements, a pair of lower locking elements spaced from the upper locking elements, and a pair of middle locking elements disposed between the pairs of upper and lower locking elements. Each pair of locking elements may be selectively engageable with each other to a buckled position and may include one locking element disposed on each side of the centerline.

Each pair of locking elements may be engaged with the upper webbings.

The pair of lower locking elements may be engaged with the lower webbings, and the pair of middle locking elements may be engaged with the middle webbings.

The restraint system may include an intermediate webbing on each side of the centerline extending transversely from the respective middle webbing to the respective upper webbing. The pair of upper locking elements may be engaged with the intermediate webbings.

Each upper webbing may include an upper portion extending from the respective upper retractor to the respective upper locking element. The upper portions may converge towards the upper locking elements in the buckled position.

Each upper webbing may include a middle portion extending from the respective upper locking element to the respective middle locking element. The middle portions may converge towards the middle locking elements in the buckled position.

Each middle portion may extend transverse to the respective upper portion.

Each upper webbing may include a lower portion extending from the respective middle locking element to the respective lower locking element. Each lower portion may be orthogonal to the respective lower webbing in the buckled position.

Each lower portion may extend transverse to the respective middle portion and the respective upper portion.

The restraint system may include a floor. The seat may be supported by and rotatable relative to the floor.

The seatback may be pivotable relative to the seat bottom to a reclined position.

With reference to the Figures, wherein like numerals indicate like parts throughout the several views, a vehicle 10 is generally shown. The vehicle 10 includes a restraint system 12 having a seat 14 and three pairs of retractors 16, 18, 20. The seat 14 defines a centerline CL and includes a seat bottom 22 and a seatback 24. A pair of upper retractors 16 is disposed on the seatback 24, a pair of lower retractors 18 is disposed on the seat bottom 22 and a pair of middle retractors 20 is disposed on the seat 14 between the pairs of upper and lower retractors 18. Each pair of retractors include one retractor disposed on each side of the centerline CL.

During a vehicle impact, momentum of the occupant may bias the occupant away from the seat 14. In this situation, the restraint system 12 may assist in retaining the occupant on the seat 14. The seat 14 may be moveable to multiple positions within the vehicle 10, as discussed further below. The retractors 16, 18, 20 are moveable with the seat 14. In other words, the retractors 16, 18, 20 are fixed relative to the seat 14, which allows the restraint system 12 to retain the occupant on the seat 14 regardless of a position or orientation of the seat 14. As one example, the seat 14 may be movable to a reclined position, as described below, and the retractors 16, 18, 20 retain the occupant on the seat 14 in the reclined position. In the reclined, position, the occupant may sleep. The retractors 16, 18, 20 retain the occupant on the seat 14 in the reclined position in any facing direction of the seat 14, i.e., pivoted to any angular position as described below.

The vehicle 10 may be any suitable type of automobile, e.g., a passenger or commercial automobile such as a sedan, a coupe, a truck, a sport utility vehicle, a crossover vehicle, a van, a minivan, a taxi, a bus, etc. The vehicle 10, for example, may be an autonomous vehicle. In other words, the vehicle 10 may be autonomously operated such that the vehicle 10 may be driven without constant attention from a driver, i.e., the vehicle 10 may be self-driving without human input.

With reference to FIG. 1, the vehicle 10 includes a body 26 defining a passenger cabin 28. The passenger cabin 28 houses occupants, if any, of the vehicle 10. The passenger cabin 28 includes a front end (not numbered) and a rear end (not numbered) with the front end being in front of the rear end during forward movement of the vehicle 10. The passenger cabin 28 includes one or more seats 14. The seats 14 may be arranged in any suitable arrangement. For example, one or more of the seats 14 may be at the front end of the passenger cabin 28, i.e., a front seat, and/or one or more of the seats 14 may be at the rear end of the passenger cabin 28, i.e., a rear seat.

With continued reference to FIG. 1, the body 26 includes a floor 30. The floor 30 may define the lower boundary of the passenger cabin 28 and may extend from the front end of the passenger cabin 28 to the rear end of the passenger cabin 28.

Figure 2A:
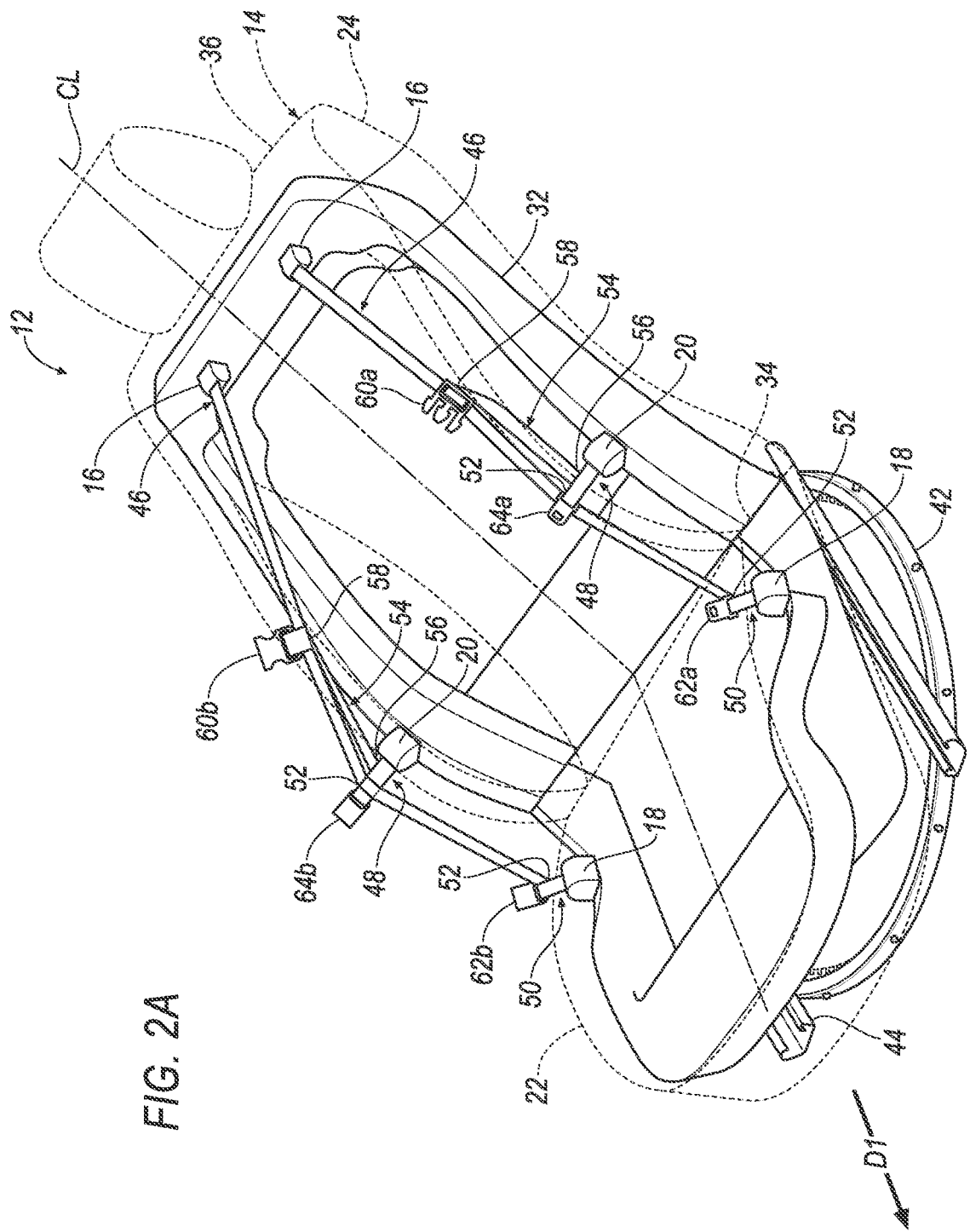
FIG. 2A is a perspective view of a seat including a harness in a disengaged position.

With continued reference to FIG. 2A, each seat 14 may define a seat-forward direction D1. The seat-forward direction D1 extends forward relative to the seat 14. For example, the seat-forward direction D1 may extend from a rear of the seat 14 to a front of the seat 14 relative to an occupant of the seat 14, i.e., the occupant of the seat 14 faces in the seat-forward direction D1. As another example, the seat bottom 22 may extend from the seatback 24 in the seat-forward direction D1.

With reference to FIG. 2A, the seat 14 may include a seat frame 32 and a covering (not numbered) supported on the seat frame 32. The seat frame 32 may include tubes, beams, etc. The seat frame 32 may support cushions in the seatback 24, seat bottom 22, and/or head restraint. The seat frame 32 may be any suitable plastic material, e.g., carbon fiber reinforced plastic (CFRP), glass fiber-reinforced semi-finished thermoplastic composite (organosheet), etc. As another example, some or all components of the seat frame 32 may be any suitable metal, e.g., steel, aluminum, etc.

The covering of the seat 14 may include upholstery and padding. The upholstery may be cloth, leather, faux leather, or any other suitable material. The upholstery may be stitched in panels around the seat frame 32. The padding may be between the covering and the seat frame 32 and may be foam or any other suitable material. The covering may include a class-A surface.

With reference to the Figures, each seat 14 may include the seatback 24, the seat bottom 22, and a head restraint (not numbered). The head restraint may be supported by the seatback 24 and may be stationary or movable relative to the seatback 24. The seatback 24 may be supported by the seat bottom 22 and may be stationary or movable relative to the seat bottom 22. The seatback 24, the seat bottom 22, and/or the head restraint may be adjustable in multiple degrees of freedom. Specifically, the seatback 24, the seat bottom 22, and/or the head restraint may themselves be adjustable, in other words, adjustable components within the seatback 24, the seat bottom 22, and/or the head restraint, and/or may be adjustable relative to each other.

The seatback 24 may be pivotable relative to the seat bottom 22 to a plurality of angular positions. In other words, the seatback 24 may be disposed to any suitable angular position relative to the seat bottom 22. For example, the seatback 24 may be generally upright, i.e., orthogonal, relative to the seat bottom 22, as shown by one seat 14 in FIG. 1. As another example, the seatback 24 may be reclined relative to the seat bottom 22, as shown by the other seat 14 in FIG. 1. In other words, the seatback 24 may be in the reclined position. In such an example, the seatback 24 may be oblique to the seat bottom 22. Alternatively, the seatback 24 may be parallel to the seat bottom 22. The seatback 24 may be releasably fixed in position relative to the seat bottom 22 at a selected one of the plurality of angular positions in any suitable way.

As shown in the Figures, the seatback 24 may include a lower end 34 adjacent to the seat bottom 22 and an upper end 36 spaced from the lower end 34. The upper end 36 may be adjacent to the head restraint. Specifically, the upper end 36 of the seatback 24 may support the head restraint.

With reference to FIG. 2A, the centerline CL may extend along the seat bottom 22 and the seatback 24. For example, the centerline CL may extend from the upper end 36 of the seatback 24 to the lower end 34 of the seatback 24 and from the seatback 24 along the seat bottom 22 in the seat-forward direction D1. The centerline CL may bisect both the seat bottom 22 and the seatback 24. For example, the centerline CL be midway between the sides of the seat 14.

Figure 2B:
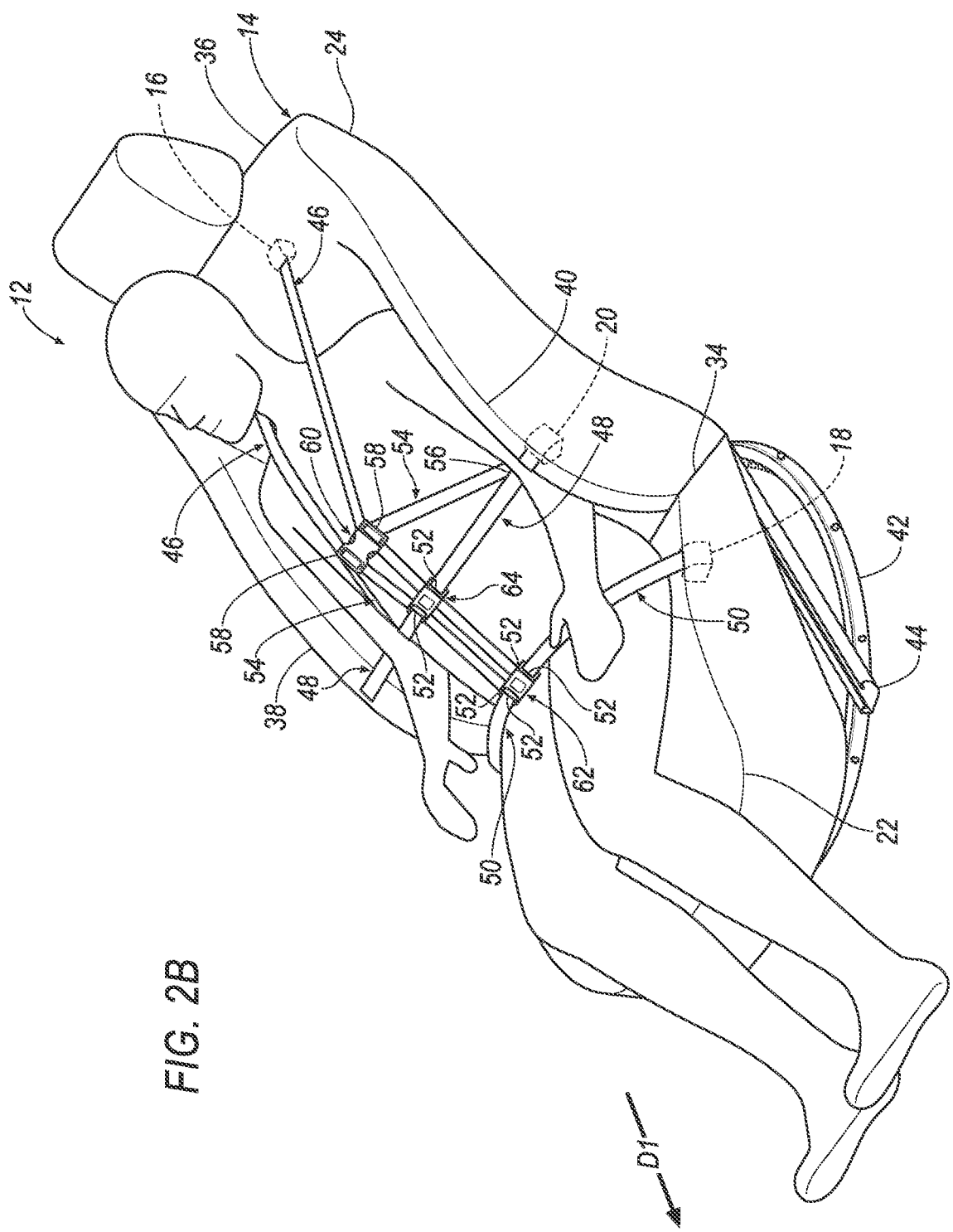
FIG. 2B is a perspective view of the seat including the harness in an engaged position.

With reference to FIG. 2B, the seatback 24 has a first bolster 38 and a second bolster 40 spaced from each other. The seatback 24 may terminate at the bolsters 38, 40. A backrest (not numbered) may extend from the first bolster 38 to the second bolster 40. The bolsters 38, 40 may extend from the backrest in a direction that an occupant of the seat 14 would face, that is, in the seat-forward direction D1. The bolsters 38, 40 may extend along the seatback 24 in an upward direction as defined by the seat 14. For example, the bolsters 38, 40 may extend from the lower end 34 towards the upper end 36 of the seatback 24. The bolsters 38, 40 may support an occupant laterally relative to the seat 14.

Figure 3:
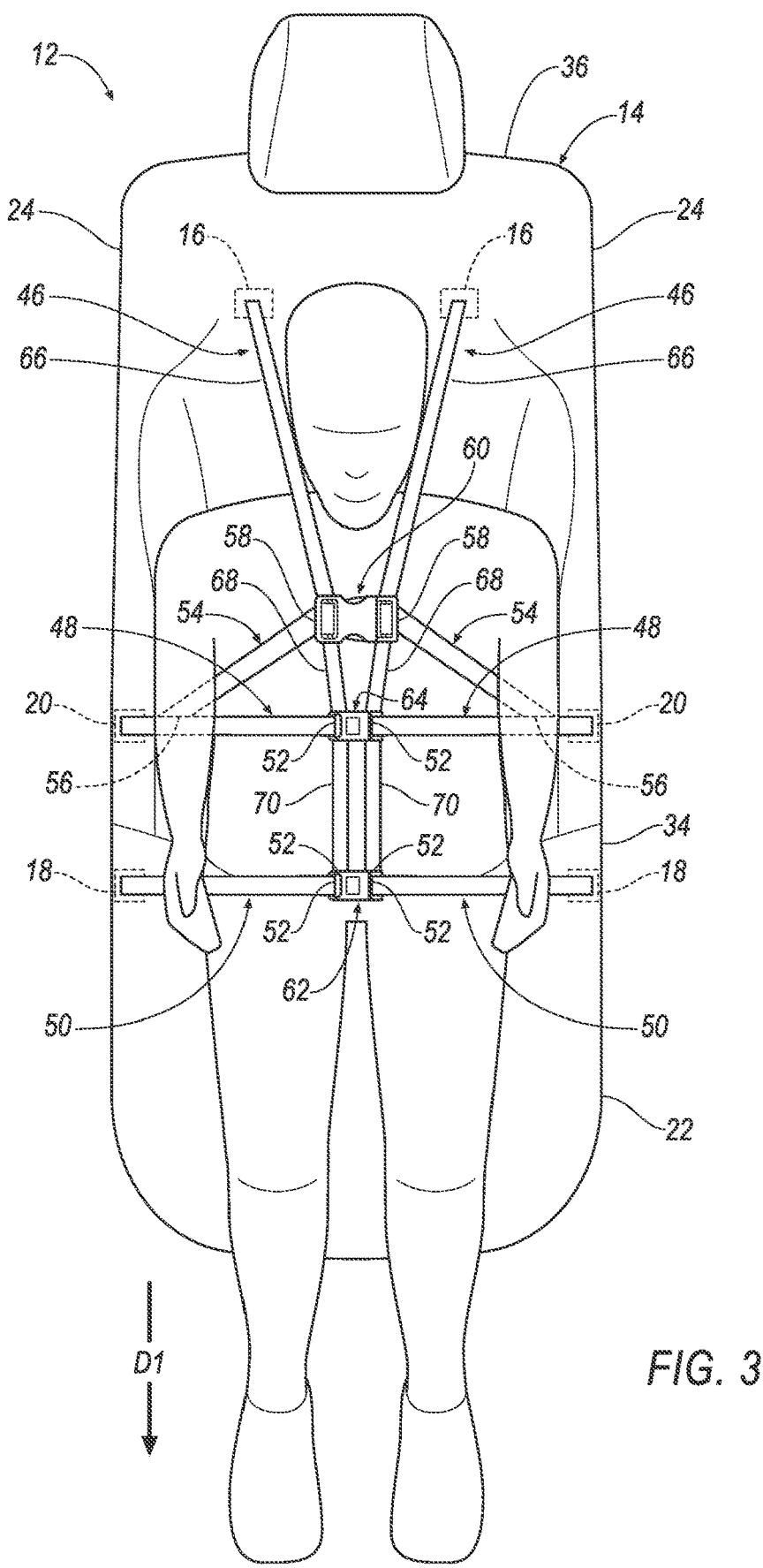
FIG. 3 is a top view of the seat including the harness in the engaged position.

Each seat 14 is supported by the floor 30, as shown in FIG. 1. The orientation of the seats 14 relative to the floor 30, i.e., the direction of the seat-forward direction D1 may be adjustable by an occupant. Each seat 14 may be rotatable relative to the floor 30. For example, each seat 14 may be supported by a pivotable base 42 supported by the floor 30, as shown in FIGS. 1-3. Each seat 14 may pivot about an axis (not numbered). The axis may extend through the floor 30 and the seat bottom 22. In other words, the seat 14 is rotatable to face in different directions. For example, one seat 14 in FIG. 1 is facing forwardly and the other seat 14 in FIG. 1 is facing rearwardly. The seat 14 may rotate completely, i.e. 360° about the axis. The seat 14 may rotate to face any number of directions. In addition to being rotatable to move the seat-forward direction D1, each seat 14 may slide relative to the floor 30, e.g., in a vehicle fore-and-aft direction. In such an example, the seat 14 may be supported on a seat track 44 fixed to the floor 30 to allow the seat 14 to move vehicle fore-and-aft. As another example, each seat 14 may, for example, be fixed relative to the floor 30. In this situation, the seat 14 may be immovable relative to the floor 30.

With reference to FIGS. 2A and 2B, as one example, the base 42 is mounted to the floor 30 and the seat track 44 mounted to the base 42. The seat track 44 may be supported on the base 42 and the seat bottom 22 may be supported on the seat track 44. The base 42 may be rotatable relative to the floor 30.

The base 42 may be of any suitable configuration. As one example, the base 42 may include a fixed ring (not numbered) and a rotatable ring (not numbered), as shown in FIG. 3. In such an example, the fixed ring is fixed to the floor 30, i.e., the fixed ring does not move relative to the floor 30. The rotatable ring is concentric with the fixed ring, i.e., the fixed ring and the rotatable ring share a common center point. The rotatable ring is rotatably supported by the fixed ring. The rotatable ring rotates relative to the fixed ring, allowing the seat 14 to rotate relative to the fixed ring.

The seat track 44 supports the seat bottom 22 on the base 42, e.g., on the rotatable ring. The seat 14 is selectively slidable relative to the seat track 44. In other words, the occupant may slide the seat bottom 22 along the seat track 44 and may secure the seat bottom 22 to the seat track 44 at a selected position.

The vehicle 10 may include any suitable number of restraint systems 12. For example, the vehicle 10 may include one restraint system 12 for each seat 14, as shown in FIG. 1. Each restraint system 12 includes the three pairs of retractors 16, 18, 20. As set forth above, each pair of retractors 16, 18, 20 includes one retractor disposed on each side of the centerline CL. The pairs of retractors 16, 18, 20 may be mirror images of each other about the centerline CL.

The pair of upper retractors 16 may be disposed on the seatback 24. For example, the pair of upper retractors 16 may be attached to the seatback 24. Specifically, the pair of upper retractors 16 may be mounted to the seat frame 32, as shown in FIG. 2A. The pair of upper retractors 16 may be mounted to the seat frame 32 in a same or different manner. The pair of upper retractors 16 may be mounted to the seat frame 32 in any suitable manner, e.g., fasteners, welding, etc. The pair of upper retractors 16 may be disposed at the upper end 36 of the seatback 24. For example, the pair of upper retractors 16 may be disposed adjacent to the shoulders of an occupant of the seat 14, as shown in FIG. 3. In other words, each upper retractor 16 may be disposed adjacent to one shoulder of the occupant of the seat 14, respectively. The pair of upper retractors 16 may be spaced any suitable amount from the centerline CL. For example, each upper retractor 16 may be disposed between the centerline CL and the respective bolster 38, 40.

The pair of lower retractors 18 may be disposed on the seat bottom 22. For example, the pair of lower retractors 18 may be attached to the seat bottom 22. Specifically, the pair of lower retractors 18 may be mounted to the seat frame 32, as shown in FIG. 2A. The pair of lower retractors 18 may be mounted to the seat frame 32 in a same or different manner. The pair of lower retractors 18 may be mounted to the seat frame 32 in any suitable manner, e.g., fasteners, welding, etc. The pair of lower retractors 18 may be disposed adjacent to the legs, e.g., the hips, of the occupant of the seat 14, as shown in FIG. 3. In other words, each lower retractor 18 may be disposed adjacent to one leg of the occupant of the seat 14, respectively. The pair of lower retractors 18 may be spaced any suitable amount from the centerline CL. For example, each lower retractor 18 may be disposed on the sides of the seat bottom 22, i.e., below the respective bolster 38, 40.

As set forth above, the pair of middle retractors 20 are disposed between the pair of upper retractors 16 and the pair of lower retractors 18. The pair of middle retractors 20 may be mounted to the seat frame 32, as shown in FIG. 2A. The pair of middle retractors 20 may be mounted to the seat frame 32 in a same or different manner. The pair of middle retractors 20 may be mounted to the seat frame 32 in any suitable manner, e.g., fasteners, welding, etc. The pair of middle retractors 20 may be disposed on the seatback 24. For example, the pair of middle retractors 20 may be disposed between the pair of upper retractors 16 and the lower end 34 of the seatback 24. Specifically, each middle retractor 20 may be positioned adjacent to a respective upper arm of an occupant between $5^{th}$-percentile female and $95^{th}$ percentile male stature sitting in the seat 14, as shown in FIG. 3. The $5^{th}$ percentile female and $95^{th}$ percentile male stature may be based on a standards-setting body, e.g., a government agency such as the National Highway Traffic Safety Administration (NHTSA). As one example, NHTSA has defined the $5^{th}$ percentile female stature to be 5 feet tall and 110 pounds, e.g., the Hybrid III $5^{th}$ percentile female. As another example, NHTSA has defined the $95^{th}$ percentile male stature to be 6 feet 2 inches tall and 220 pounds, e.g., the Hybrid III $95^{th}$ percentile male.

The restraint system 12 may include three pairs of webbings 46, 48, 50, as shown in the Figures. For example, the restraint system 12 may include a pair of upper webbings 46 each retractably engaged with the respective upper retractor 16, a pair of middle webbings 48 each retractably engaged with the respective middle retractor 20, and a pair of lower webbings 50 each retractably engaged with the respective lower retractor 18. Each pair of webbings 46, 48, 50 includes one webbing disposed on each side of the centerline CL. The pairs of webbings 46, 48, 50 may be mirror images of each other about the centerline CL.

Each webbing 46, 48, 50 may include a first end (not shown) retractably engaged with the respective retractor 16, 18, 20 and a second end 52 payable from the respective retractor 16, 18, 20. Each webbing 46, 48, 50, e.g., the first end, is coupled to the respective retractor 16, 18, 20, such as attached to and wound about a spool (not shown). Each webbing 46, 48, 50 may be retractable to a retracted position and extendable to an extended position relative to the respective retractor 16, 18, 20. In the retracted position, each webbing 46, 48, 50 may be retracted into the respective retractor 16, 18, 20, i.e., wound around the respective spool. In the extended position, each webbing 46, 48, 50 may be paid out from the respective retractor 16, 18, 20, e.g., towards the occupant. In other words, the second end 52 of each webbing 46, 48, 50 is closer to the respective retractor 16, 18, 20 in the retracted position as compared to the extended position.

Each webbing 46, 48, 50 may extend through the covering of the seat 14, as shown in FIG. 3. In other words, the covering of the seat 14 may be disposed between the first end of the respective webbing 46, 48, 50 and the second end 52 of the respective webbing 46, 48, 50. Said differently, each retractor 16, 18, 20 may be covered by the covering of the seat 14. The covering may, for example, include a slot (not shown) disposed adjacent to each retractor 16, 18, 20, and each webbing 46, 48, 50 may extend through and be moveable relative to the respective slot. Each webbing 46, 48, 50 may be a same or different material. For example, each webbing 46, 48, 50 may be fabric, e.g., nylon fabric, in the shape of a strap.

With reference to FIG. 3, each upper webbing 46 may extend transverse to the respective lower webbing 50 and the respective middle webbing 48 in the extended position. Said differently, each lower webbing 50 and each middle webbing 48 may extend from the respective retractor 16, 18, 20 to the respective upper webbing 46. For example, each upper webbing 46 may be a shoulder belt. In such an example, the webbing, in the extended position, extends over a shoulder and vertically along a torso of the occupant of the seat 14. In other words, each upper webbing 46 may extend from the respective upper retractor 16 towards the seat bottom 22. Said differently, each upper webbing 46 may be elongated along the seatback 24 in the extended position. In this situation, each lower webbing 50 may, for example, be a lap belt. In such an example, the webbing, in the extended position, extends over a waist and horizontally across the torso occupant of the seat 14. Additionally, each middle webbing 48 may be positioned to extend behind the respective upper arm of the occupant between $5^{th}$-percentile female and $95^{th}$ percentile male stature sitting in the seat 14. In other words, each middle webbing 48 may extend horizontally across the torso of the occupant on the seat 14. Said differently, each middle webbing 48 extends under the respective upper arm of the occupant in the extended position.

The webbings 46, 48, 50 on each side of the centerline CL may be engaged with each other. Specifically, the webbings 46, 48, 50 on each side of the centerline CL may be fixed relative to each other. Said differently, the webbings 46, 48, 50 on each side of the centerline CL may be referred to as "a harness." In other words, the restraint system 12 may include one harness on each side of the centerline CL, as shown in FIG. 2A. Each lower webbing 50 and each middle webbing 48 may, for example, be attached to the respective upper webbing 46. Specifically, the second end 52 of each lower webbing 50 and the second end 52 of each middle webbing 48 may be attached to the respective upper webbing 46. For example, the second end 52 of each middle webbing 48 may be attached to the respective upper webbing 46, e.g., between the first end and the second end 52 of the respective upper webbing 46. Additionally, the second end 52 of each lower webbing 50 may be attached to the second end 52 of the respective upper webbing 46. In other words, each upper webbing 46 may extend to the respective lower webbing 50. Each lower webbing 50 and each middle webbing 48 may be attached to the respective upper webbing 46 in a same or different manner. Each lower webbing 50 and each middle webbing 48 may be attached to the respective upper webbing 46 in any suitable manner, e.g., stitching, ultrasonic welding, etc.

In the extended position, the middle webbings 48 and the lower webbings 50 may extend in a same or different direction. For example, each middle webbing 48 may extend transverse to the respective lower webbing 50. As another example, each middle webbing 48 may extend parallel to the respective lower webbing 50, as shown in FIG. 3.

The restraint system 12 may include a pair of intermediate webbings 54, as shown in the Figures. The pair of intermediate webbings 54 may include an intermediate webbing 54 disposed on each side of the centerline CL. The pair of intermediate webbings 54 may be mirror images about the centerline CL. The intermediate webbings 54 may be a same or different material as the webbing. For example, each intermediate webbing 54 may be fabric, e.g., nylon fabric, in the shape of a strap.

Each intermediate webbing 54 may extend from the respective middle webbing 48 to the respective upper webbing 46. Specifically, each intermediate webbing 54 may extend transversely from the respective middle webbing 48 to the respective upper webbing 46, as shown in the Figures. In other words, each intermediate webbing 54 may extend diagonally relative to each of the respective middle webbing 48 and the respective upper webbing 46. In this situation, the intermediate webbing 54 and a portion of both the middle webbing 48 and the upper webbing 46 on each side of the centerline CL may be a triangle, as shown in FIG. 3. Said differently, the intermediate webbing 54 and the portion of both the upper webbing 46 and the middle webbing 48 on each side of the centerline CL may be one leg of the triangle.

Each intermediate webbing 54 may include a first terminus 56 and a second terminus 58 spaced from the first terminus 56. The first terminus 56 of each intermediate webbing 54 may be engaged with the respective middle webbing 48. The first terminus 56 may be engaged with the respective middle webbing 48 between the first end and the second end 52 of the respective middle webbing 48. The second terminus 58 of each intermediate webbing 54 may be engaged with the respective upper webbing 46. The second terminus 58 may be engaged with the respective upper webbing 46 at any suitable location on the respective upper webbing 46. For example, the second terminus 58 may be engaged with the respective webbing 46, 48, 50 between the first end and the second end 52 of the respective webbing 46, 48, 50. Specifically, the second terminus 58 of each intermediate webbing 54 may be engaged with the respective upper webbing 46 between the respective middle webbing 48 and the respective upper retractor 16. The intermediate webbings 54 may be attached to the respective webbing 46, 48, 50 in any suitable manner, e.g., stitching, ultrasonic welding, etc.

The restraint system 12 may include three pairs of locking elements 60, 62, 64 spaced from each other, as shown in the Figures. Said differently, the restraint system 12 may include a pair of upper locking elements 60, a pair of lower locking elements 62 spaced from the pair of upper locking elements 60, and a pair of middle locking elements 64 disposed between the pairs of upper and lower locking elements 62. Each pair of locking elements 60, 62, 64 may include one locking element disposed on each side of the centerline CL, as shown in FIG. 2A. The pair of upper locking elements 60 may be disposed between the pair of lower locking elements 62 and the pair of upper retractors 16.

Each pair of locking elements 60, 62, 64 may be a same or different type of locking element. Each pair of locking elements 60, 62, 64 may be any suitable type of locking element. For example, as shown in the Figures, the pair of lower locking elements 64 and the pair of middle locking elements 62 may be a seatbelt buckle, and the pair of upper locking elements may be a side release buckle. Each pair of locking elements 60, 62, 64 may, for example, include a male member 60a, 62a, 64a, e.g., a latch, a tongue, etc., and a female member 60b, 62b, 64B, e.g., a buckle, as shown in the Figures. Each male member 60a, 62a, 64a may, for example, be disposed on the same side of the centerline CL, as shown in the Figures. In other words, the locking elements 60, 62, 64 on each side of the centerline CL may be the same. As another example, at least one male member 60a, 62a, 64a may be disposed on each side of the centerline CL. In other words, the locking elements 60, 62, 64 on each side of the centerline CL may be different.

Each pair of locking elements 60, 62, 64 may be engaged with at least one pair of webbings 46, 48, 50. In other words, each locking element 60, 62, 64 may be engaged with at least one webbing 46, 48, 50 on the respective side of the centerline CL. Each pair of locking elements 60, 62, 64 may be engaged with the webbings 46, 48, 50 at any suitable position on the webbings, e.g., at the second end 52, between the first end and the second end 52, etc. Each pair of locking elements 60, 62, 64 may be engaged with the webbings 46, 48, 50 in any suitable manner, e.g., stitching, ultrasonic welding, etc.

Each pair of locking elements 60, 62, 64 may, for example, be engaged with the upper webbings 46. In other words, the upper locking element 60, the middle locking element 64, and the lower locking on each side of the centerline CL may be engaged with the respective upper webbing 46. In this situation, the lower locking elements 62 may be engaged with the second end 52 of the respective upper webbing 46, and the upper and middle locking elements 64 each may be engaged at any suitable position between the first end and the second end 52 of the respective upper webbing 46. Additionally, the pair of lower locking elements 62 may be engaged with the lower webbings 50. In this situation, each lower locking element 62 may be engaged with the respective lower webbing 50, e.g., the second end 52, and the respective upper webbing 46, e.g., the second end 52. Additionally, the pair of middle locking elements 64 may be engaged with the middle webbings 48. In this situation, each middle locking element 64 may be engaged with the respective middle webbing 48, e.g., the second end 52, and the respective upper webbing 46. Also, the pair of upper locking elements 60 may be engaged with the intermediate webbings 54. In this situation, each upper locking element 60 may be engaged with the respective intermediate webbing 54, e.g., the second terminus 58, and the respective upper webbing 46.

The locking elements 60, 62, 64 of each pair of locking elements 60, 62, 64 are selectively engageable with each other from an unbuckled position to a buckled position. In the unbuckled position, the locking elements 60, 62, 64 are spaced from each other, i.e., not engaged with each other, as shown in FIG. 2A. In this situation, the harness on one side of the centerline CL is moveable relative to the harness on the other side of the centerline CL. In the buckled position, the locking elements 60, 62, 64 are engaged with each other, i.e., fixed relative to each other, as shown in FIGS. 2B and 3. In this situation, the harnesses are fixed relative to each other. In other words, the locking elements 60, 62, 64 prevent the harnesses from moving relative to each other. Additionally, in the buckled position, the harnesses may retain an occupant on the seat 14.

The pairs of locking elements 60, 62, 64 may have a length (not numbered) in the buckled position. The length may extend transverse to the seat-forward direction D1. For example, the length may extend horizontally along the torso of the occupant in the seat 14. The pair of upper locking elements 60 may be longer, i.e., have a greater length, than the pairs of lower and middle locking elements 62, 64, as shown in FIG. 3. The pairs of lower and middle locking elements 62, 64 may have the same length.

With reference to FIG. 3, each upper webbing 46 may include an upper portion 66 extending from the respective upper retractor 16 to the respective upper locking element 60, i.e., the respective intermediate webbing 54. The upper portions 66 may converge towards the upper locking elements 60 in the buckled position. In other words, the upper portions 66 may extend inwardly from the respective upper retractors 16 to the respective upper locking elements 60 in the buckled position. Said differently, the upper portions 66 may define an opening for receiving a head of the occupant in the buckled position. The opening narrows along the upper portions 66 from the seatback 24 to the upper locking elements 60.

With continued reference to FIG. 3, each upper webbing 46 may include a middle portion 68 extending from the respective upper locking element 60, i.e., the respective upper portion 66, to the respective middle locking element 64, i.e., the respective middle webbing 48. The middle portions 68 may converge towards the middle locking elements 64 in the buckled position. Since the pair of upper locking elements 60 are longer in the buckled position as compared to the pair of middle locking elements 64, each middle portion 68 may extend transverse to the respective upper portion 66. Said differently, each middle portion 68 may extend inwardly from the respective upper portion 66 to the respective middle locking element 64. In other words, each middle portion 68 may extend transverse to the respective middle webbing 48 and the respective intermediate webbing 54.

With continued reference to FIG. 3, each upper webbing 46 may include a lower portion 70 extending from the respective middle locking element 64, i.e., the respective middle portion 68, to the respective lower locking element 62, i.e., the respective lower webbing 50. The lower portions 70 may extend transverse to the respective middle portion 68 and the respective upper portion 66. Specifically, since the pair of lower locking elements 62 have a same length in the buckled position as the pair of middle locking elements 64, each lower portion 70 may be orthogonal to the respective lower webbing 50 in the buckled position. Each lower portion 70 may, for example, be orthogonal to the respective middle webbing 48. As another example, each lower portion 70 may be oblique to the respective middle webbing 48.

The restraint system 12 may operate in a variety of positions. For example, the restraint system 12 may be positioned in a completely unbuckled position, a semi-buckled position, and a completely buckled position. In the completely unbuckled position, none of the pair of locking elements 60, 62, 64 are engaged, as shown in FIG. 2. In other words, each of the locking elements 60, 62, 64 are in the unbuckled position. In this situation, the middle webbings 48 and the lower webbings 50 may each be in the retracted position, as shown in FIG. 2A. Additionally, the upper webbings 46 may be in the extended position. In the semi-buckled position, at least one of the pair of lower locking elements 62 and the pair of middle locking elements 64 are engaged in the buckled position. For example, when the seatback 24 is generally upright relative to the seat bottom 22, the pair of lower locking elements 62 may be engaged in the buckled position. In this situation, the restraint system 12 may be a "two-point harness," i.e., the pair of middle locking elements 64 and the pair of upper locking elements 60 each are in the unbuckled position. As another example, the pair of lower locking elements 62 and the pair of middle locking elements 64 each may be engaged in the buckled position. In this situation, the restraint system 12 may be a "four-point harness," i.e., the pair of upper locking elements 60 are in the unbuckled position In the completely buckled position, each pair of locking elements 60, 62, 64 are engaged in the buckled position, as shown in FIGS. 2B and 3. In this situation, each of the upper webbings 46, the middle webbings 48, and the lower webbings 50 may be in the extended position. Said differently, the restraint system 12 may be a "six-point harness" in the completely buckled position.

When an occupant sits on the seat 14, the occupant may selectively engage one or more pairs of locking elements 60, 62, 64 from the unbuckled position to the buckled position. In other words, the occupant may selectively engage the restraint system 12 from the completely unbuckled position to one of the semi-buckled position and the completely buckled position. Additionally, the occupant may adjust the position of the seatback 24 relative to the seat bottom 22. When the restraint system 12 is in the completely buckled position, the restraint system 12 may retain an occupant on the seat 14 regardless of the angular position of the seatback 24. For example, the restraint system 12 in the completely buckled position may retain the occupant on the seat 14 when the seatback 24 is upright, i.e., generally orthogonal relative to the seat bottom 22. As another example, the restraint system 12 in the completely buckled position may retain the occupant on the seat 14 when the seatback 24 is reclined relative to the seat bottom 22, i.e., in the reclined position. Said differently, the restraint system 12 may retain the occupant in a seated or a lying position on the seat 14. Also, the occupant may adjust the position of the seat bottom 22 relative to the floor 30. For example, the occupant may rotate the seat 14 to face rearwardly, as shown in FIG. 1. Since the restraint system 12 is fixed relative to the seat 14, the restraint system 12 may retain the occupant on the seat 14 regardless of the position or orientation of the seat 14 relative to the floor 30, i.e., the passenger cabin 28.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A restraint system comprising:
   a seat defining a centerline and including a seat bottom and a seatback; and
   a pair of upper retractors disposed on the seatback, a pair of lower retractors disposed on the seat bottom, and a pair of middle retractors disposed on the seat between the pairs of upper and lower retractors, each pair of retractors including one retractor disposed on each side of the centerline;
   wherein the pair of middle retractors are disposed on the seatback.

2. The restraint system of claim 1, wherein the seatback includes a lower end adjacent to the seat bottom and an upper end spaced from the lower end, the pair of upper retractors disposed at the upper end of the seatback.

3. The restraint system of claim 1, wherein each middle retractor is positioned adjacent to a respective upper arm of an occupant between 5th-percentile female and 95th-percentile male stature sitting in the seat.

4. The restraint system of claim 1, further comprising a pair of upper webbings each retractably engaged with the respective upper retractor, a pair of middle webbings each retractably engaged with the respective middle retractor, and a pair of lower webbings each retractably engaged with the respective lower retractor, each upper webbing extends transverse to the respective lower webbing and the respective middle webbing.

5. The restraint system of claim 4, wherein each lower webbing and each middle webbing are attached to the respective upper webbing.

6. The restraint system of claim 4, wherein each middle webbing is positioned to extend behind a respective upper arm of an occupant between 5th-percentile female and 95th-percentile male stature sitting in the seat.

7. The restraint system of claim 4, further comprising an intermediate webbing disposed on each side of the centerline, each intermediate webbing extending transversely from the respective middle webbing to the respective upper webbing.

8. The restraint system of claim 7, wherein each intermediate webbing includes a first terminus attached to the respective middle webbing and a second terminus attached to the respective upper webbing, each second terminus disposed between the respective middle webbing and the respective upper retractor.

9. The restraint system of claim 4, further comprising a pair of upper locking elements, a pair of lower locking elements spaced from the upper locking elements, and a pair of middle locking elements disposed between the pairs of upper and lower locking elements, each pair of locking elements selectively engageable with each other to a buckled position and including one locking element disposed on each side of the centerline.

10. The restraint system of claim 9, wherein each pair of locking elements are engaged with the upper webbings.

11. The restraint system of claim 10, wherein the pair of lower locking elements are engaged with the lower webbings, and the pair of middle locking elements are engaged with the middle webbings.

12. The restraint system of claim 11, further comprising an intermediate webbing on each side of the centerline extending transversely from the respective middle webbing to the respective upper webbing, and wherein the pair of upper locking elements are engaged with the intermediate webbings.

13. The restraint system of claim 10, wherein each upper webbing includes an upper portion extending from the respective upper retractor to the respective upper locking element, the upper portions converging towards the upper locking elements in the buckled position.

14. The restraint system of claim 13, wherein each upper webbing includes a middle portion extending from the respective upper locking element to the respective middle locking element, the middle portions converging towards the middle locking elements in the buckled position.

15. The restraint system of claim 14, wherein each middle portion extends transverse to the respective upper portion.

16. The restraint system of claim 14, wherein each upper webbing includes a lower portion extending from the respective middle locking element to the respective lower locking element, each lower portion being orthogonal to the respective lower webbing in the buckled position.

17. The restraint system of claim 16, wherein each lower portion extends transverse to the respective middle portion and the respective upper portion.

18. The restraint system of claim 1, wherein the seatback is pivotable relative to the seat bottom to a reclined position.

19. A restraint system comprising:
   a seat defining a centerline and including a seat bottom and a seatback;
   a pair of upper retractors disposed on the seatback, a pair of lower retractors disposed on the seat bottom, and a pair of middle retractors disposed on the seat between the pairs of upper and lower retractors, each pair of retractors including one retractor disposed on each side of the centerline;
   a pair of upper webbings each retractably engaged with the respective upper retractor, a pair of middle webbings each retractably engaged with the respective middle retractor, and a pair of lower webbings each retractably engaged with the respective lower retractor, each upper webbing extends transverse to the respective lower webbing and the respective middle webbing; and
   an intermediate webbing disposed on each side of the centerline, each intermediate webbing extending transversely from the respective middle webbing to the respective upper webbing.

20. A restraint system comprising:

a seat defining a centerline and including a seat bottom and a seatback;

a pair of upper retractors disposed on the seatback, a pair of lower retractors disposed on the seat bottom, and a pair of middle retractors disposed on the seat between the pairs of upper and lower retractors, each pair of retractors including one retractor disposed on each side of the centerline;

a pair of upper webbings each retractably engaged with the respective upper retractor, a pair of middle webbings each retractably engaged with the respective middle retractor, and a pair of lower webbings each retractably engaged with the respective lower retractor, each upper webbing extends transverse to the respective lower webbing and the respective middle webbing; and a pair of upper locking elements, a pair of lower locking elements spaced from the upper locking elements, and a pair of middle locking elements disposed between the pairs of upper and lower locking elements, each pair of locking elements selectively engageable with each other to a buckled position and including one locking element disposed on each side of the centerline.

* * * * *